(12) United States Patent
Boersma et al.

(10) Patent No.: US 8,291,003 B2
(45) Date of Patent: Oct. 16, 2012

(54) SUPPORTING MULTIPLE FORMATS IN A FLOATING POINT PROCESSOR

(75) Inventors: Maarten J. Boersma, Holzgerlingen (DE); K. Michael Kroener, Ehningen (DE); Petra Leber, Ehningen (DE); Silvia M. Mueller, Altdorf (DE); Jochen Preiss, Boeblingen (DE); Kerstin Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 12/207,067

(22) Filed: Sep. 9, 2008

(65) Prior Publication Data
US 2010/0063987 A1 Mar. 11, 2010

(51) Int. Cl.
*G06F 7/38* (2006.01)
(52) U.S. Cl. .......................... 708/498; 708/204
(58) Field of Classification Search .................. 708/204, 708/498
See application file for complete search history.

(56) References Cited

U.S. PATENT DOCUMENTS

| | | | | |
|---|---|---|---|---|
| 5,235,533 | A | * | 8/1993 | Sweedler ................. 708/204 |
| 6,631,392 | B1 | * | 10/2003 | Jiang et al. .............. 708/498 |
| 6,714,957 | B1 | * | 3/2004 | Lohman ................. 708/498 |
| 6,996,596 | B1 | | 2/2006 | Ho et al. |
| 7,113,969 | B1 | | 9/2006 | Green et al. |
| 7,290,023 | B2 | | 10/2007 | Dhong et al. |

OTHER PUBLICATIONS

An American National Standard; IEEE Standard for Binary Floating-Point Arithmetic; The Institute of Electrical and Electronics Engineers, Inc. (Copyright 1985), IEEE 754-1985.
DRAFT Standard for Floating-Point Arithmetic P754, Oct. 5, 2007, Copyright 2007 by the IEEE.
P6 Binary Floating-Point Unit, Son Dao Trong et al., IBM Server Division.

* cited by examiner

*Primary Examiner* — Chuong D Ngo
(74) *Attorney, Agent, or Firm* — Cantor Colburn LLP; John Campbell

(57) ABSTRACT

In a binary floating point processor, the exponents of each of the various types of operands are recoded into an internal format, by biasing the exponents with the minimum exponent value of the result precision ("Emin"), i.e., the recoded value of the exponent is the represented value of the exponent minus Emin. Emin depends only on the result precision of the instruction that is currently being executed in the binary floating point processor. The exponent computations are then performed in this new format. The underflow check for all result precisions is a check against zero and overflow checks are performed against a positive number that depends on the result precision. The exponent values are in a 2's complement representation, so the underflow check simply becomes a check of the sign bit.

3 Claims, 4 Drawing Sheets

SUPPORTING MULTIPLE FORMATS IN A FLOATING POINT PROCESSOR

GOVERNMENT RIGHTS

This invention was made with Government support under Contract No. HR0011-07-9-0002 awarded by DARPA. The Government has certain rights in this invention.

BACKGROUND

The present invention relates generally to floating point processors, and, more particularly, to an enhanced internal floating point processor format for exponent mapping.

A binary floating point processor ("BFP") typically has to support operands and results in multiple formats, for example, 64-bit double precision ("DP") in IEEE coding, 32-bit single precision ("SP") in IEEE coding, SP in 64-bit DP IEEE coding, or 32-bit SP in Graphics or Non-Java coding. State-of-the-art BFPs typically support mixed precision, i.e., the formats of each operand and the result are independent and can be different. To support all of these and other formats in an efficient manner, the BFP converts its operands during the unpacking stage into a special internal format, and after the final rounding stage the result is converted back into the instruction specific format. The entire computation inside the BFP core is mainly independent of the input and output formats. Of importance is the internal format that the exponents get recoded into. In order to represent all possible intermediate exponents, the internal exponent format of state-of-the-art BFPs usually has two more bits than the widest input exponent. For BFPs supporting DP inputs, this might be a 13-bit biased format which guarantees that all occurring exponents can be represented with positive numbers. Recoding the inputs into this format can be done with little hardware effort by replicating a few bits. The major drawback of the format is that for each supported result precision, overflow and underflow checking logic is required. More specifically, each result precision has a different constant to check against for the underflow check. Overflow checks are only needed in the final rounding step, but underflow checks are needed frequently throughout the various BFP stages and these checks are relatively timing critical (e.g., exponent computation, aligner shift amount, normalizer shift amount, rounder), which adds to the overall delay and area of the BFP.

BRIEF SUMMARY

According to an embodiment of the invention, in a binary floating point processor, the exponents of each of the various types of operands are recoded into an internal format, by biasing the exponents with the minimum exponent value of the result precision ("Emin"), i.e., the recoded value of the exponent is the represented value of the exponent minus Emin. Emin depends only on the result precision of the instruction that is currently being executed in the binary floating point processor. The exponent computations are then performed in this new format. The underflow check for all result precisions is a check against zero and overflow checks are performed against a positive number that depends on the result precision. The exponent values are in a 2's complement representation, so the underflow check simply becomes a check of the sign bit.

BRIEF DESCRIPTION OF THE SEVERAL VIEWS OF THE DRAWINGS

Referring to the exemplary drawings wherein like elements are numbered alike in the several Figures.

DETAILED DESCRIPTION

Figure 1:
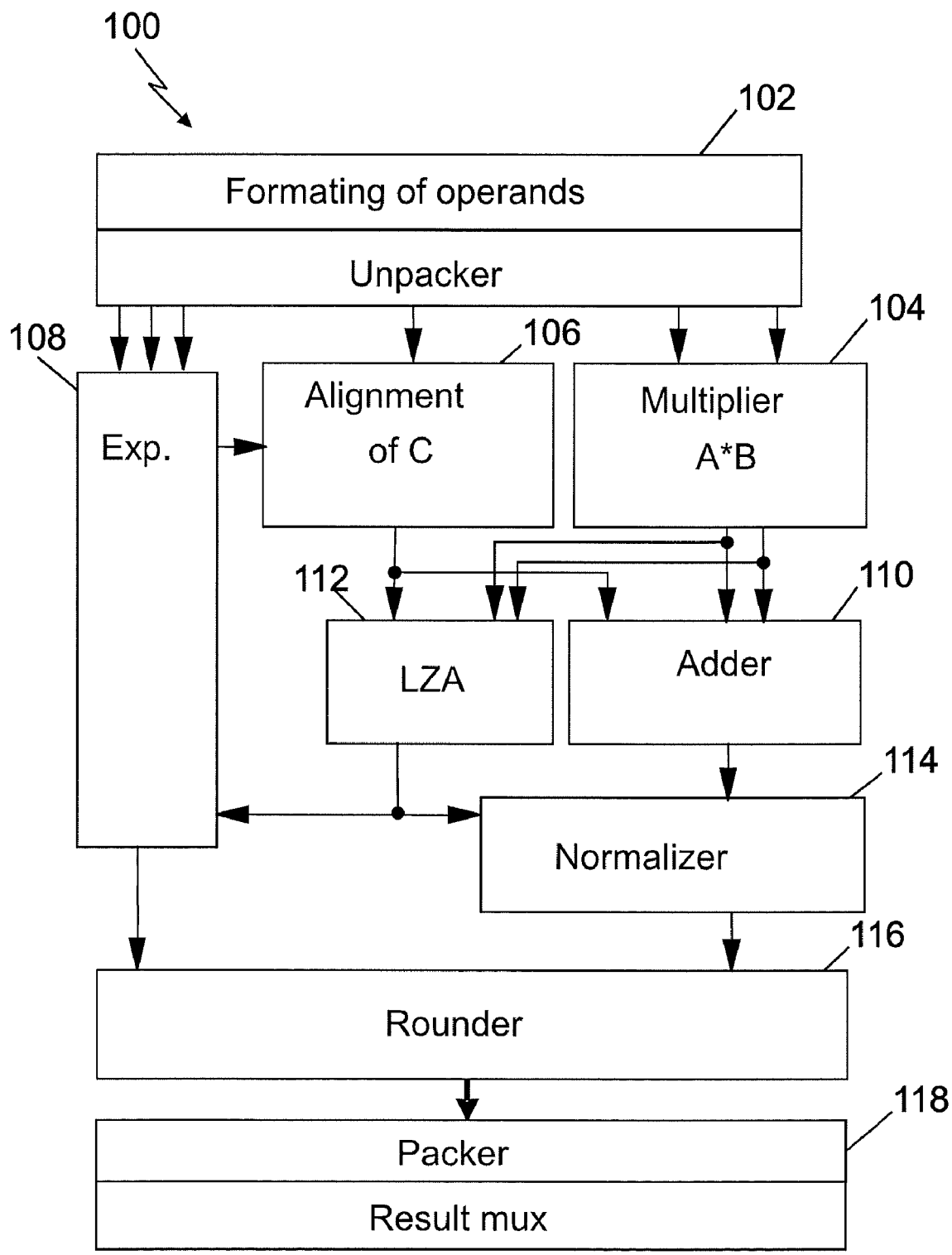
FIG. 1 is a block diagram of a binary floating point processor in which an embodiment of the invention may be implemented.

Referring to FIG. 1, there illustrated is a block diagram of a binary floating point processor ("BFP") 100, in which an embodiment of the invention may be implemented. The BFP 100 may operate according to the fused multiply-add dataflow ("R=C+A*B"), where "A" is the multiplicand, "B" is the multiplier, "C" is the addend, and "R" is the result. The dataflow of the BFP 100 illustrated in FIG. 1 includes a block 102 to format and unpack the operand into its sign, exponent and fraction components. The dataflow also includes a multiplier 104, a block 106 to properly align the addend to the product of the multiplier before the addend can be added or combined with the product, and an exponent dataflow block 108. The BFP dataflow further includes an adder 110, a leading zero anticipator 112, a normalizer 114, and a rounder 116. Finally, a packer 118 is shown along with its corresponding result multiplexer that converts the rounded result back into the instruction specific format.

In accordance with an embodiment of the invention, in the BFP 100 of FIG. 1, the exponents of each of the various types of operands are recoded such that the exponents are converted into an internal format, by biasing the exponents with the minimum exponent value of the result precision ("Emin"), i.e., the recoded value of the exponent is the represented value of the exponent minus Emin. Emin depends only on the result precision of the instruction that is currently being executed in the BFP. The exponent computations are then performed in this new format. The underflow checks for all result precisions are a check against zero and overflow checks are performed against a positive number that depends on the result precision. The exponent values are in a 2's complement representation, so the underflow check simply becomes a check of the sign bit.

Figure 2:
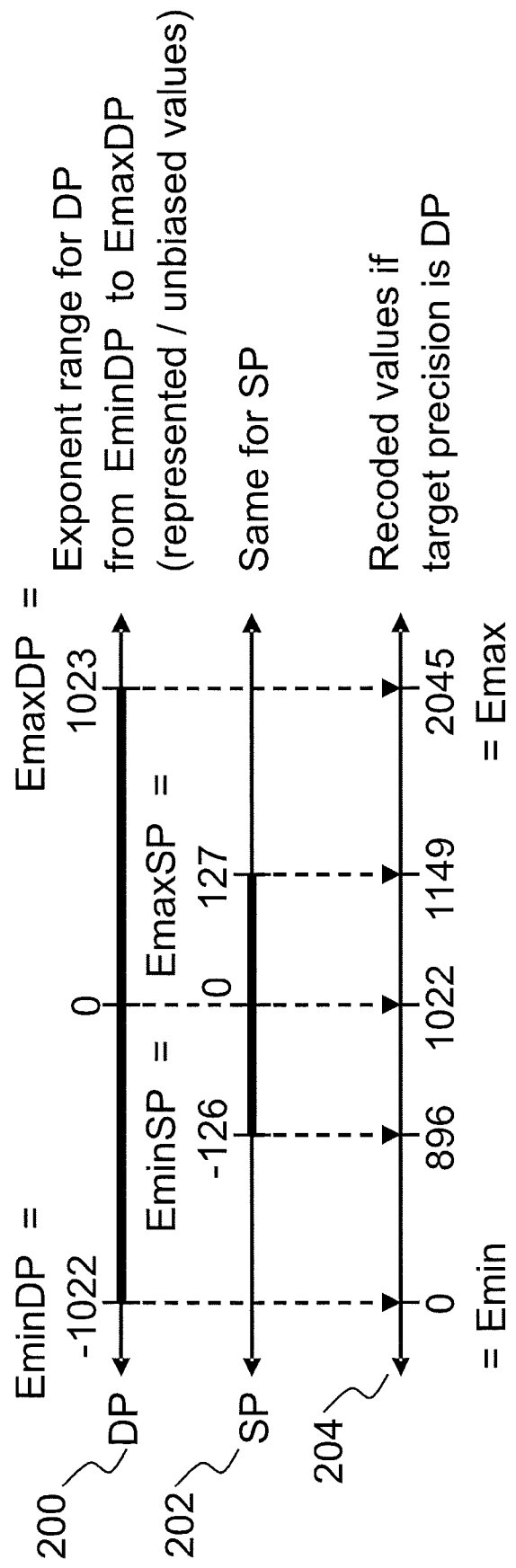
FIG. 2 illustrates an example of an embodiment of the invention for the recoding of both a double precision number and a single precision number if the result is a double precision number.

FIG. 2 illustrates an example of an embodiment of the invention for both a double precision ("DP") number 200 and a single precision ("SP") number 202 if the result precision is DP, i.e., if Emin=−1022. As specified by the IEEE format and as shown in FIG. 2, the maximum and minimum values of the unbiased exponent of a double precision number are +1023 ("EmaxDP") and −1022 ("EminDP"), respectively. The absolute value of the range of these exponents is 2045. Similarly, as specified by the IEEE format and as shown in FIG. 2, the maximum and minimum values of the unbiased exponent of a single precision number are +127 ("EmaxSP") and −126 ("EminSP"), respectively. The absolute value of the range of these exponents is 253.

FIG. 2 also illustrates the results 204 of the recoding/mapping operations of an embodiment of the invention. The formula for the recoding/mapping operation can be written as E=e−Emin, where e is the represented value of the exponent, Emin is the minimum exponent of the result precision, i.e., Emin=EminDP=−1022 since the result is a DP number, and E is the recoded exponent. Specifically, FIG. 2 illustrates that the value of −1022, which is the minimum exponent for double precision (EminDP), is recoded to the origin or zero value. The value of −126, which is the minimum exponent for single precision (EminSP) is mapped to the positive value EminSP−Emin=896. In a similar manner, FIG. 2 illustrates that the value of EmaxDP of +1023 for double precision is recoded and mapped to a value of EmaxDP−Emin=2045, which is the maximum allowed exponent in the result precision (Emax). The value of EmaxSP of +127 for single precision is recoded and mapped to a value of 1149. Thus, a new internal BFP exponent format has been created by an embodiment of the invention.

Figure 3:
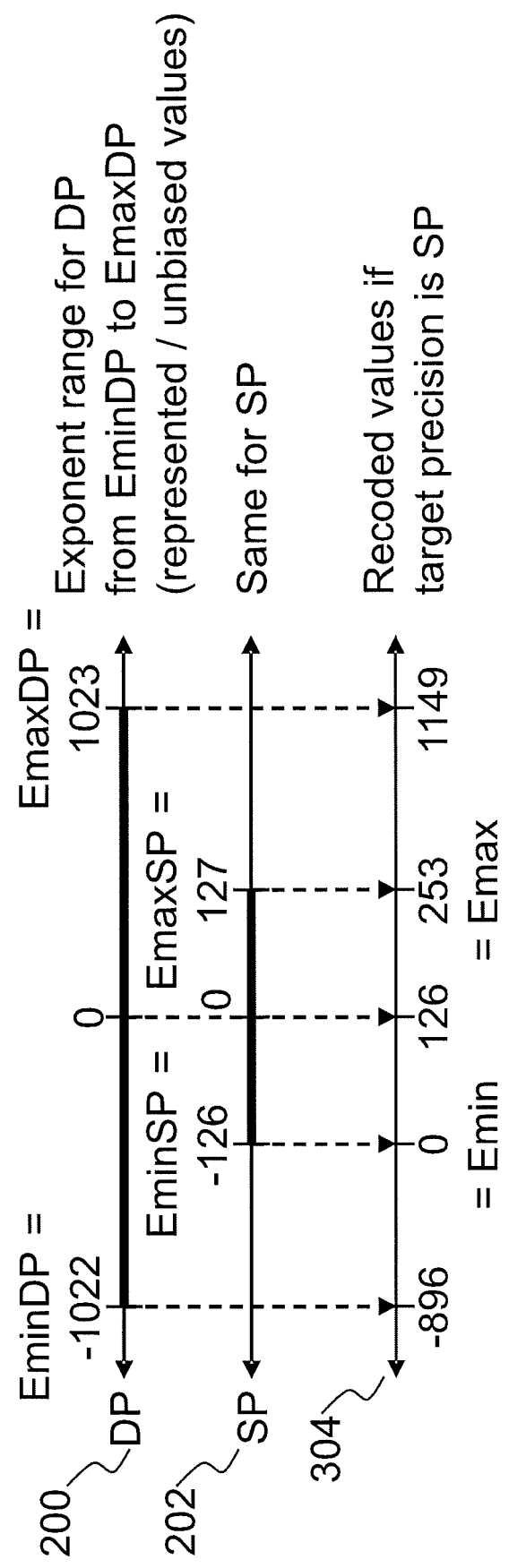
FIG. 3 illustrates an example of an embodiment of the invention for the recoding of both a double precision number and a single precision number if the result is a single precision number.

FIG. 3 illustrates an example of an embodiment of the invention for both a double precision ("DP") number 200 and a single precision ("SP") number 202 if the result precision is SP, i.e., if Emin=−126. The formula for the recoding/mapping operation can again be written as E=e−Emin, where e is the represented value of the exponent, Emin is the minimum exponent of the result precision, i.e., Emin=EminSP=−126 since the result is an SP number, and E is the recoded exponent. Specifically, FIG. 3 illustrates that the value of −126, which is the minimum exponent for single precision (EminSP) is recoded to the origin or zero value. The value of −1022, which is the minimum exponent for double precision (EminDP), is mapped to the negative value EminDP−Emin=−896, where the sign correctly indicates that this exponent would create an underflow for SP results. In a similar manner, FIG. 3 illustrates that the value of EmaxDP of +1023 for double precision is recoded and mapped to a value of EmaxDP −Emin=1149, which is larger than the maximum allowed exponent in the result precision (Emax). The value of EmaxSP of +127 for single precision is recoded and mapped to a value of 253. Thus, a second internal BFP exponent format has been created by an embodiment of the invention.

When the BFP 100 then performs an exponent calculation, the BFP utilizes the new internal BFP exponent format which depends on the result precision, i.e., double precision, single precision, etc. The intermediate results of the exponent calculation may be much smaller than the value of Emin, which is now zero for any result format, according to an embodiment of the invention. In this case, the intermediate exponent value is a negative number, using two's complement representation. As a result of the embodiment of the invention described above, when the BFP 100 performs an exponent underflow check, the underflow check compares the represented intermediate exponent against Emin, i.e., the recoded value against Emin−Emin=0. Thus, all of the underflow checks for all of the various operand precisions and input formats compare the exponents against 0, instead of different values, as in the prior art. As a result, an underflow condition is indicated by simply inspecting the sign bit of the exponent, since the sign bit indicates a negative number. Thus, this underflow check involves no added hardware for the BFP and, thus, no additional latency is incurred. Note, with known designs, each underflow check requires a, e.g., 13-bit comparator. The new exponent format according to an embodiment of the invention, therefore, allows a saving of all of the underflow check comparators and results in less timing critical data paths. This results in a faster and smaller design of the BFP 100.

An example of the implementation of the recoding from an IEEE biased exponent format to the internal format of FIGS. 2 and 3 together with an operation in the new internal format within the binary floating point processor is given now. Assume "P" is the product of operand A and operand B. The exponent, ep, of P is calculated as ep=ea+eb, where ea is the exponent of operand A and eb is the exponent of operand B. An underflow condition is generated if ep<Emin. For the example, it is assumed that ea=−64 and eb=−63 which are both represented in DP IEEE coding, i.e., the encoded value is the represented value plus the double precision bias ("biasDP") which is +1023. Let ea' and eb' be the values of ea and eb, respectively, in DP IEEE coding, i.e., ea'=−64+1023=959 and eb'=−63+1023=960. For the recoding/mapping into the new format, the formula for the exponent is E=e−Emin with e=e'−biasDP. The product exponent ep=ea+eb is recoded/mapped into the new format as follows:

$$EP=ea+eb-Emin$$

$$E=(ea'-biasDP)+(eb'-biasDP)-Emin$$

with $Emin=-1022$ for $DP$ results and $Emin=-126$ for $SP$ results

The constants in this equation can be combined to a single constant which is only dependent on the result precision:

$$EP=(ea'-1023)+(eb'-1023)-(-1022)=ea'+eb'-1024$$
for $DP$ results and $$EP=(ea'-1023)+(eb'-1023)-(-126)=ea'+eb'-1920 \text{ for}$$
$SP$ results.

Replacing ea' and eb' with the values of the example, one gets:

$$EP=959+960-1024=895 \text{ for } DP \text{ results and}$$

$$EP=959+960-1920=-1 \text{ for } SP \text{ results.}$$

The check whether the product generates an underflow can be reduced to checking whether EP is smaller than zero which is true for SP results only. This can easily be verified, since ea+eb=−127 is smaller than EminSP but larger than EminDP. Note that the computation of EP comprises adding ea', eb' and a single constant. Adding a constant is already needed for removing the IEEE bias in the computation of the represented value of the product exponent. Thus, no additional hardware is needed.

Figure 4:
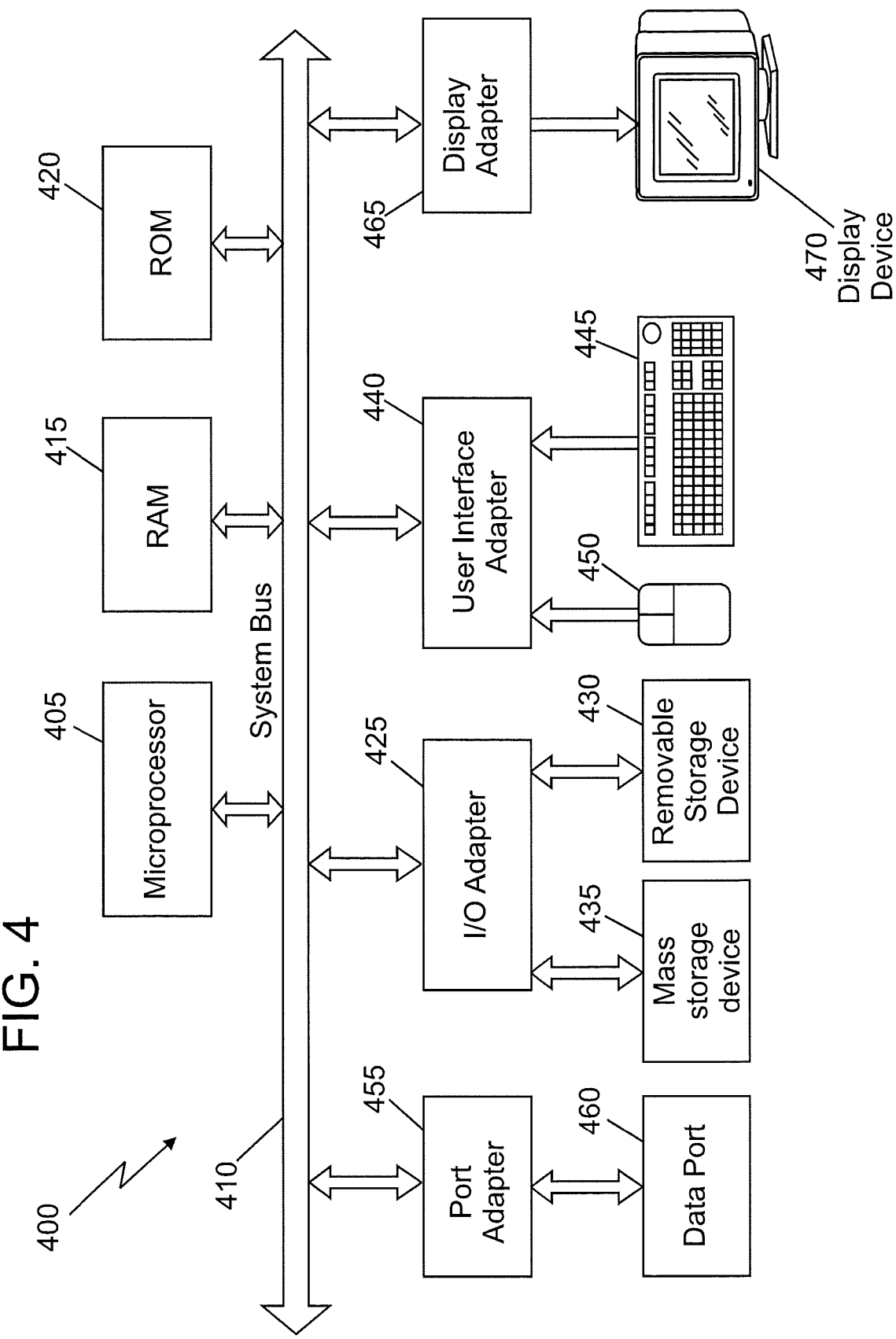
FIG. 4 is a schematic block diagram of a general-purpose computer suitable for practicing embodiments of the present invention.

Generally, the embodiments disclosed herein may be practiced with a general-purpose computer and the embodiments may be coded as a set of instructions on removable or hard media for use by the general-purpose computer. FIG. 4 is a schematic block diagram of a general-purpose computer system 400 suitable for practicing embodiments of the present invention. In FIG. 4, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    recoding a first range of numbers to a second range of numbers by a binary floating point processor, wherein the first and second range of numbers comprise exponents, the exponents comprising a portion of a word utilized within the binary floating point processor, wherein the recoding depends on a condition, and the recoding is performed by subtracting a minimum exponent of a result precision of an instruction executed by the binary floating point processor from the first range of numbers;
    performing at least one computation on the second range of numbers by the binary floating point processor and providing at least one intermediate number as a result of the at least one computation performed on the second range of numbers, wherein the at least one intermediate number is in 2's complement representation; and
    performing at least one check against a constant in the first range of numbers by checking the at least one intermediate number against zero by the binary floating point processor checking a sign bit of the at least one intermediate number as an exponent underflow check, wherein the value of the constant in the first range of numbers depends on the condition, and the condition depends on a minimum allowed exponent of the result precision of the instruction executed by the binary floating point processor.

2. A system for implementing a method, comprising:
    a computing network including a processing device in communication with one or more computer memory storage devices; and
    the computing network further configured to implement a method, the method further comprising:
    recoding a first range of numbers to a second range of numbers, wherein the first and second range of numbers comprise exponents, the exponents comprising a portion of a word utilized within a binary floating point processor, wherein the recoding depends on a condition, and the recoding is performed by subtracting a minimum exponent of a result precision of an instruction executed by the binary floating point processor from the first range of numbers;
    performing at least one computation on the second range of numbers and providing at least one intermediate number as a result of the at least one computation performed on the second range of numbers, wherein the at least one intermediate number is in 2's complement representation; and
    performing at least one check against a constant in the first range of numbers by checking the at least one intermediate number against zero using a sign bit of the at least one intermediate number as an exponent underflow check, wherein the value of the constant in the first range of numbers depends on the condition, and the condition depends on a minimum allowed exponent of the result precision of the instruction executed by the binary floating point processor.

3. A computer-program product comprising a tangible storage medium readable by a binary floating point processor and storing instructions for execution by the binary floating point processor for performing a method, the method comprising:
    recoding a first range of numbers to a second range of numbers by the binary floating point processor, wherein the first and second range of numbers comprise exponents, the exponents comprising a portion of a word utilized within the binary floating point processor, wherein the recoding depends on a condition, and the recoding is performed by subtracting a minimum exponent of a result precision of an instruction executed by the binary floating point processor from the first range of numbers;

performing at least one computation on the second range of numbers by the binary floating point processor and providing at least one intermediate number as a result of the at least one computation performed on the second range of numbers, wherein the at least one intermediate number is in 2's complement representation; and performing at least one check against a constant in the first range of numbers by checking the at least one intermediate number against zero by the binary floating point processor checking a sign bit of the at least one intermediate number as an exponent underflow check, wherein the value of the constant in the first range of numbers depends on the condition, and the condition depends on a minimum allowed exponent of the result precision of the instruction executed by the binary floating point processor.

* * * * *